United States Patent
Makihara et al.

(10) Patent No.: US 11,488,751 B2
(45) Date of Patent: Nov. 1, 2022

(54) ELASTIC BODY, BUMP STOP, ELECTROMAGNETIC INDUCTION DEVICE, POWER GENERATION SYSTEM, DETECTION DEVICE, AND PRODUCTION METHOD FOR ELASTIC BODY

(71) Applicants: INOAC CORPORATION, Nagoya (JP); NAGOYA INSTITUTE OF TECHNOLOGY, Nagoya (JP)

(72) Inventors: Nobuyuki Makihara, Okazaki (JP); Yasushi Ido, Nagoya (JP); Yuhiro Iwamoto, Gifu (JP)

(73) Assignees: INOAC CORPORATION, Nagoya (JP); NAGOYA INSTITUTE OF TECHNOLOGY, Nagoya (JP)

( * ) Notice: Subject to any disclaimer, the term of this patent is extended or adjusted under 35 U.S.C. 154(b) by 0 days.

(21) Appl. No.: 17/072,203

(22) Filed: Oct. 16, 2020

(65) Prior Publication Data
US 2021/0125758 A1    Apr. 29, 2021

(30) Foreign Application Priority Data
Oct. 29, 2019    (JP) .............................. JP2019-196810

(51) Int. Cl.
| H01F 1/06 | (2006.01) |
| H01F 7/06 | (2006.01) |
| C08J 9/00 | (2006.01) |
| C08K 3/08 | (2006.01) |
| C08J 9/30 | (2006.01) |

(52) U.S. Cl.
CPC ............ *H01F 1/061* (2013.01); *C08J 9/0066* (2013.01); *C08K 3/08* (2013.01); *H01F 7/064* (2013.01); *C08J 9/30* (2013.01); *C08J 2375/04* (2013.01); *C08K 2201/01* (2013.01)

(58) Field of Classification Search
None
See application file for complete search history.

(56) References Cited

U.S. PATENT DOCUMENTS

| 2002/0172060 | A1 | 11/2002 | Takeuchi | |
| 2007/0035892 | A1* | 2/2007 | Pullini | G01P 15/105 |
| | | | | 360/324.12 |
| 2008/0252289 | A1* | 10/2008 | Lenglet | G01R 15/185 |
| | | | | 335/297 |
| 2018/0202873 | A1* | 7/2018 | Bonifas | G01L 1/14 |

FOREIGN PATENT DOCUMENTS

| JP | 3051758 U | 9/1998 |
| JP | 2002-320369 A | 10/2002 |
| JP | 3126517 U | 11/2006 |
| JP | 3872161 B2 | 1/2007 |
| JP | 2019-022435 A | 2/2019 |

\* cited by examiner

*Primary Examiner* — Jeffrey D Washville
(74) *Attorney, Agent, or Firm* — Oliff PLC

(57) ABSTRACT

An elastic body of this disclosure contains magnetized magnetic powder dispersed in an elastic member, and generates an induced current in a circuit by undergoing an elastic deformation to cause a change in magnetic flux density. The elastic member is an elastomeric foam.

16 Claims, 11 Drawing Sheets

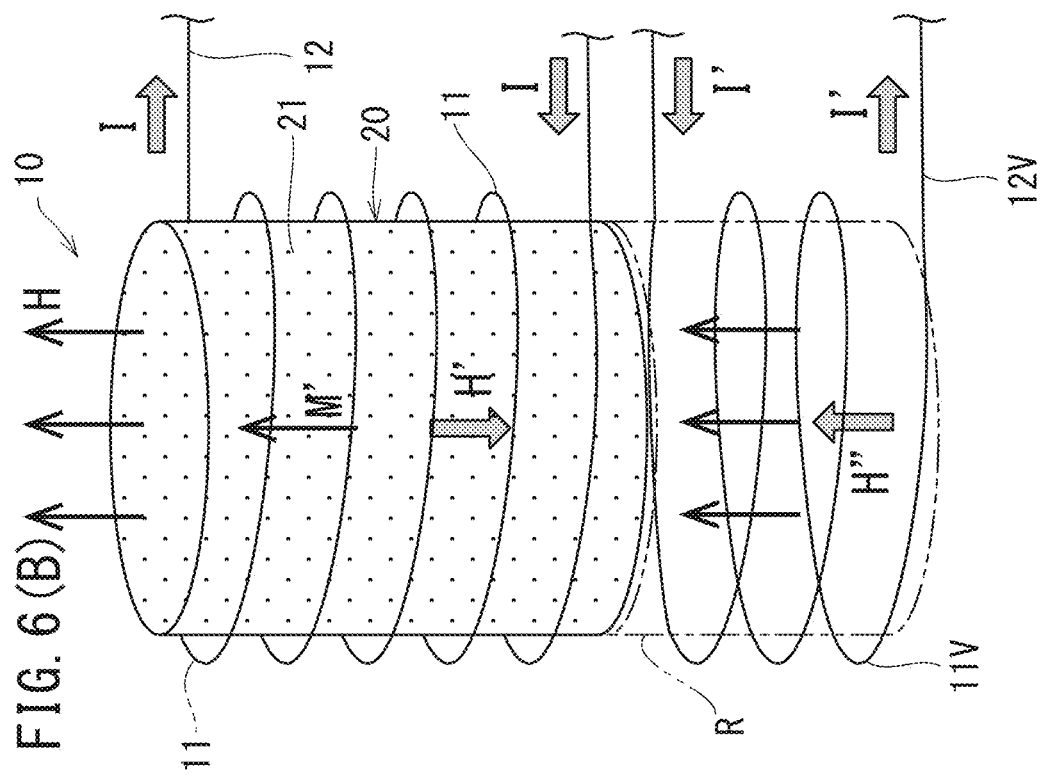
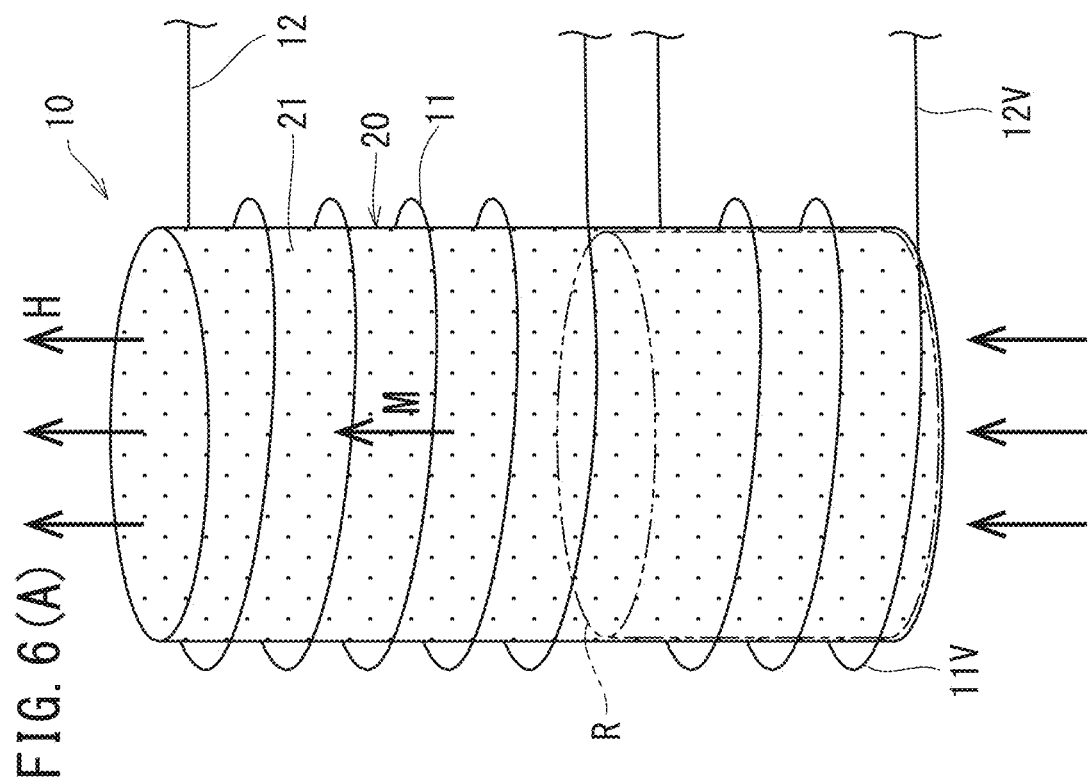

FIG. 8

| | | | TEST EXAMPLE 1 | TEST EXAMPLE 2 | TEST EXAMPLE 3 | TEST EXAMPLE 4 | TEST EXAMPLE 5 |
|---|---|---|---|---|---|---|---|
| ELASTOMERIC FOAM DENSITY | | g/cm³ | 0.5 | 0.25 | 0.5 | 0.5 | 0.5 |
| EXPANSION RATIO OF ELASTOMERIC FOAM | | FOLDS | 2 | 4 | 2 | 2 | 2 |
| COMPRESSION RATE AT THE TIME OF MAGNETIZATION | | % | 0 | 0 | 0 | 50 | 0 |
| PARTICLE SIZE OF NEODYMIUM MAGNETIC POWDER | | μm | 5 | 5 | 5 | 5 | 100 |
| MASS PERCENTAGE OF NEODYMIUM | | wt% | 50 | 50 | 60 | 60 | 60 |
| VOLUME PERCENTAGE OF NEODYMIUM MAGNETIC POWDER | | Vol% | 3.3 | 1.6 | 3.9 | 3.9 | 3.9 |
| COMPRESSION SET | | % | 23 | 21 | 25 | 25 | 25 |
| REPEATED COMPRESSION SET | | % | 15 | 13 | 18 | 18 | 18 |
| SURFACE MAGNETIC FLUX DENSITY | NATURAL LENGTH | mT | 9.2 | 4.6 | 10.3 | 9.2 | 14.6 |
| | COMPRESSED BY 10% SURFACE MAGNETIC FLUX DENSITY | mT | 9.3 | — | 10.5 | 9.9 | — |
| | COMPRESSED BY 10% CHANGE RATE | % | 1.1 | — | 1.9 | 7.6 | — |
| | COMPRESSED BY 25% SURFACE MAGNETIC FLUX DENSITY | mT | 9.5 | — | 10.7 | 10.6 | — |
| | COMPRESSED BY 25% CHANGE RATE | % | 3.3 | — | 3.9 | 15.2 | — |
| | COMPRESSED BY 50% SURFACE MAGNETIC FLUX DENSITY | mT | 9.7 | — | 10.9 | 12.6 | — |
| | COMPRESSED BY 50% CHANGE RATE | % | 5.4 | — | 5.8 | 37.0 | — |
| GENERATED POWER | COMPRESSED BY 26% (DISPLACEMENT:6mm) 1Hz | μW | 0.02 | — | 0.03 | — | — |
| | 5Hz | | 0.06 | — | 0.12 | — | — |
| | 10Hz | | 0.08 | — | 0.18 | — | — |
| | COMPRESSED BY 35% (DISPLACEMENT:8mm) 1Hz | | 0.02 | — | 0.03 | — | — |
| | 5Hz | | 0.07 | — | 0.14 | — | — |
| | 10Hz | | 0.10 | — | 0.20 | — | — |
| | COMPRESSED BY 43% (DISPLACEMENT:10mm) 1Hz | | 0.02 | — | 0.03 | — | — |
| | 5Hz | | 0.09 | — | 0.18 | — | — |
| | 10Hz | | 0.12 | — | 0.24 | — | — |

(A)

ELASTIC BODY, BUMP STOP, ELECTROMAGNETIC INDUCTION DEVICE, POWER GENERATION SYSTEM, DETECTION DEVICE, AND PRODUCTION METHOD FOR ELASTIC BODY

BACKGROUND OF THE INVENTION

(1) Field of the Invention

The present disclosure relates to an elastic body and a production method thereof, a bump stop, and also to an electromagnetic induction device that generates an induced current in a circuit, a power generation system, and a detection device.

(2) Description of Related Art

An electromagnetic induction device that generates an induced current in a circuit by vibrating a ferrite magnet is known before (see, for example, Japanese Registered Utility Model No. 3051758 paragraphs [0020] to [0022] and [0026], FIG. 1).

SUMMARY OF THE INVENTION

However, the problem with ferrite magnets was that they were readily breakable because of the brittle and fracturable nature.

An elastic body according to the present disclosure is made of an elastic member containing a magnetized magnetic powder dispersed therein and generates an induced current in a circuit by undergoing elastic deformation to cause a change in magnetic flux density, the elastic member being an elastomeric foam.

BRIEF DESCRIPTION OF THE DRAWINGS

FIG. 6A is a conceptual diagram illustrating magnetic fields created by the magnetic elastic body before being compressed and deformed and magnetization of the magnetic elastic body, and FIG. 6B is a conceptual diagram illustrating induced magnetic fields and induced currents generated in two coils and circuits when the magnetic elastic body is compressed;

FIG. 8 is a table showing the particulars and characteristics of magnetic elastic bodies of respective test examples;

DETAILED DESCRIPTION OF PREFERRED EMBODIMENTS

Figure 1:
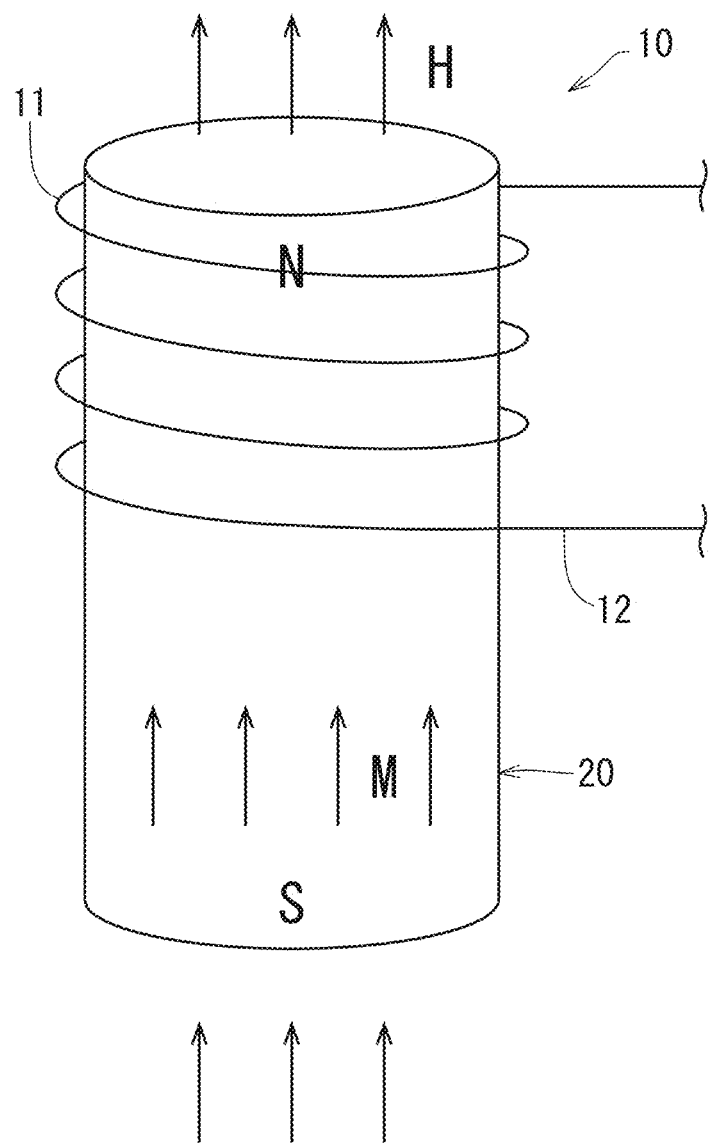
FIG. 1 is a perspective view of an electromagnetic induction device according to one embodiment of the present disclosure.

FIG. 1 illustrates an electromagnetic induction device 10 of this embodiment. The electromagnetic induction device 10 includes a circuit 12 having a winding such as a coil 11, for example, and a magnetic elastic body 20 disposed inside the winding. In this embodiment, the magnetic elastic body 20 is columnar and disposed coaxially with the coil 11 that is the winding. The magnetic elastic body 20 is magnetized in the axial direction of the magnetic elastic body 20, i.e., in the axial direction of the coil 11 (one axial end of the magnetic elastic body 20 being the north pole, the other end being the south pole). The axial length of the magnetic elastic body 20 may be longer or shorter than that of the coil 11. The magnetic elastic body 20 in this embodiment corresponds to "an elastic body" in the claims. One end face and the other end face in the axial direction of the magnetic elastic body 20 correspond to "magnetic flux passing parts" in the claims, and the axial direction of the magnetic elastic body 20 corresponds to "a main axial direction" in the claims.

Figure 2:
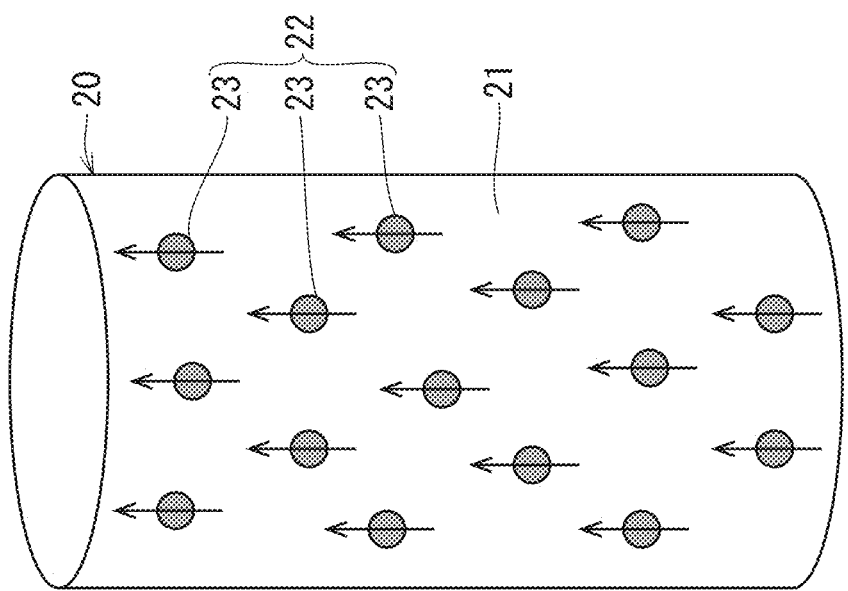
FIG. 2A is a conceptual diagram illustrating the magnetic powder dispersed in a magnetic elastic body.
FIG. 2B is a conceptual diagram illustrating the magnetic powder in the compressed magnetic elastic body.
Figure 2:
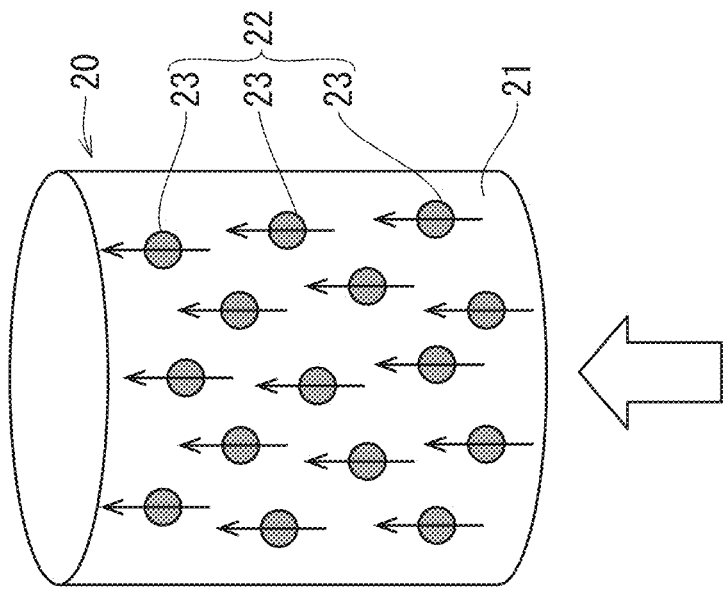

As illustrated in FIG. 2A, the magnetic elastic body 20 is made of an elastomeric foam 21 containing a magnetized magnetic powder 22 dispersed therein. The magnetic moments of the particles 23 (more particularly, the coupled magnetic moments in the particles 23) of the magnetic powder 22 in the magnetic elastic body 20 are oriented in the axial direction of the magnetic elastic body 20. In actuality, it is possible that the magnetic moments of some of the particles 23 of the magnetic powder 22 are oriented in a direction intersecting the axial direction of the magnetic elastic body 20. In this embodiment, the magnetic moments of the particles 23 of the magnetic powder 22 coupled together, i.e., the coupled magnetic moments, are oriented in the axial direction of the magnetic elastic body 20. In FIG. 2A, and FIG. 2B to be described later, the directions of magnetization of the particles 23 of the magnetic powder 22 are illustrated diagrammatically as arrows.

The elastomeric foam 21 may be a polyurethane elastomeric foam, a rubber foam, or a thermoplastic resin foam such as a polyolefin-based resin foam. The elastomeric foam 21 should preferably have a continuous air bubble structure or a semicontinuous air bubble structure from the points of view of formability and elastic deformability. The elastomeric foam 21 should preferably at least include a part that has a continuous air bubble structure so that contraction (known as shrinkage) of the elastomeric foam 21 after the forming can be inhibited. Moreover, the elastomeric foam 21 should preferably have an expansion ratio of 1.4 to 6 folds, more preferably 1.7 to 5 folds, and even more preferably 2 to 4 folds. The elastomeric foam 21 having an expansion ratio of 1.4 folds or more provides particularly good cushioning properties, and an expansion ratio of 6 folds or lower provides particularly good formability and durability. The expansion ratio mentioned above refers to that of the elastomeric foam 21 itself and not that of the magnetic elastic body 20.

Examples of the magnetic powder 22, which should preferably be made of a ferromagnetic material, include known hard magnetic materials such as neodymium magnetic powder, samarium magnetic powder, alnico magnetic powder, ferrite magnetic powder, and so on. The magnetic powder 22, in particular, is preferably a neodymium magnetic powder which exhibits a high magnetic strength when permanently magnetized. Particles 23 of the magnetic powder 22 may have a flake, spherical, or needle-like shape, for example. The magnetic powder 22 should preferably have a particle size of 3 to 200 µm, and more preferably 5 to 100 µm. Increasing the particle size of the magnetic powder 22 can raise the surface magnetic flux density of the magnetic elastic body 20. That is, if the magnetic powder 22 is made of surface-treated magnet particles, the ratio of the magnetic component of the magnetic powder 22 can be raised by increasing the particle size of the magnetic powder 22, which in turn can further raise the surface magnetic flux density of the magnetic elastic body 20. The particle size of the magnetic powder 22 should preferably be not more than 200 µm from the points of view of formability and deformability of the magnetic elastic body 20. Here the particle size is measured by a test sieving method in accordance with JIS Z 8815:1994. Magnetic powder 22 having a particle size of 3 µm or more provides a particularly good workability. Magnetic powder 22 having a particle size of not more than 200 µm provides a particularly good formability, and prevents possible detachment of the magnetic powder 22 from the elastomeric foam 21 more reliably.

The magnetic elastic body 20 should preferably contain a magnetic powder 22 made of a hard ferromagnetic material, and have a mass concentration (mass percentage) of magnetic powder 22 of 40 to 80% relative to the elastomeric foam 21, and a volume concentration (volume percentage) of magnetic powder 22 of 1.0 to 3.5% relative to the elastomeric foam 21. Such a composition allows for easy elastic deformation of the magnetic elastic body 20 and larger changes in magnetic flux density of the magnetic elastic body 20. The magnetic elastic body 20 should preferably have a compression set of not more than 30% as measured by Method A of JIS K 6262:2013. Moreover, the magnetic elastic body 20 should preferably have a repeated compression set of not more than 20% when compressed by 50% 100,000 times at 1 Hz. Elastomeric foam 21 of such a composition exhibits favorable recovery after undergoing elastic deformation. This enables use of the elastomeric foam 21 with less plastic deformation even in applications where the magnetic elastic body 20 is repeatedly compressed, which is more preferable for repeated use of magnetic elastic body 20.

Figure 3:
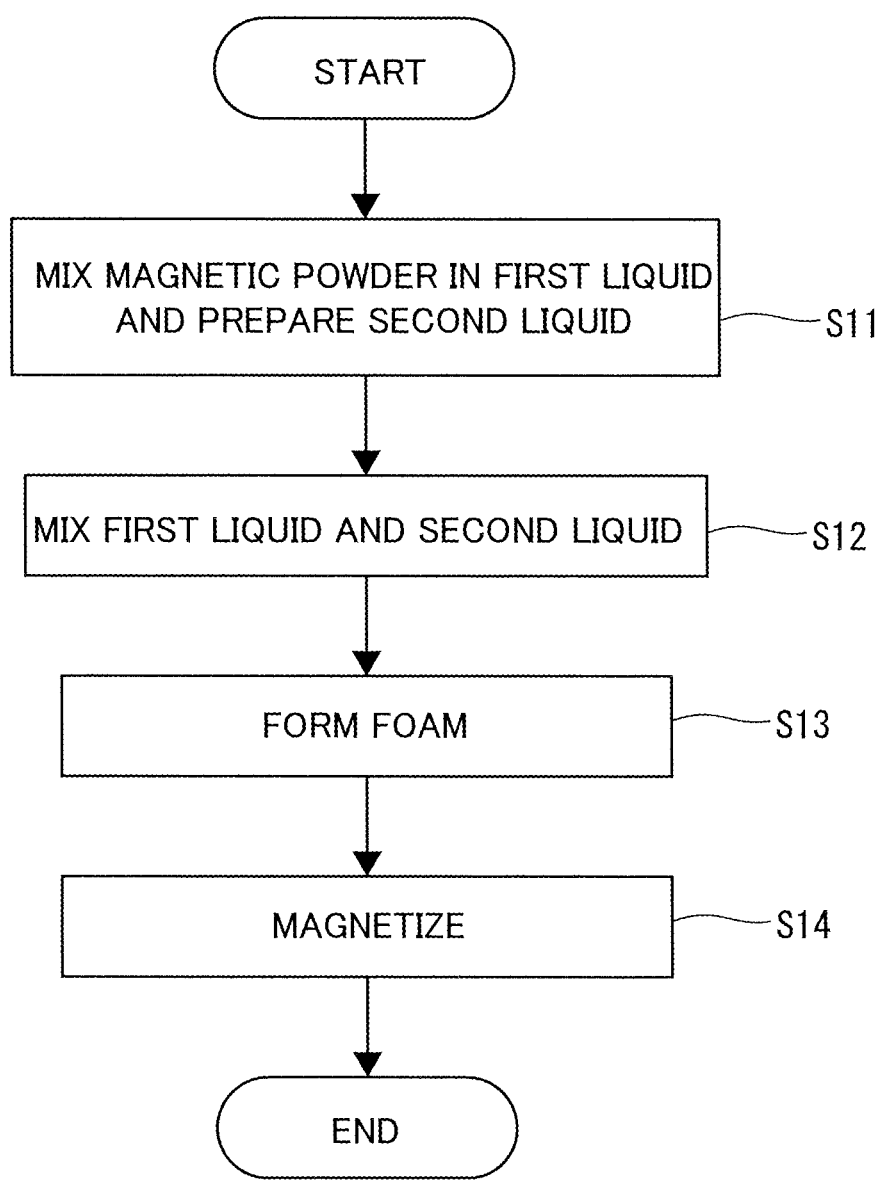
FIG. 3 is a flowchart illustrating a production method of the magnetic elastic body.

Next, a method for producing the magnetic elastic body 20 will be described with reference to FIG. 3. To produce the magnetic elastic body 20, first, a first liquid is prepared by mixing polyol and isocyanate into prepolymer. Here, the first liquid is a prepolymer having an isocyanate group (NCO) at the end. After that, the magnetic powder 22 is mixed into the first liquid and dispersed evenly (S11). Then, a second liquid containing a catalyst, a foaming agent and others is prepared (S11). After that, the first liquid and second liquid are mixed to obtain a liquid mixture (S12). The prepolymer having an isocyanate group at the end should preferably have an NCO percentage of 3 to 7%, and in this embodiment it is 6%. This enables a magnetic elastic body 20 with excellent formability and durability to be obtained.

Next, the liquid mixture is injected into a mold that is temperature regulated in advance to be expanded and cured into a molded foam of a columnar shape, for example (S13). The magnetic powder 22 is dispersed in the elastomeric foam 21 of this molded foam. In this molded foam, the magnetic moments of individual particles 23 of the magnetic powder 22 are oriented randomly. In the expansion and cure process of the liquid mixture in the mold mentioned above, the liquid is cured for a predetermined time (primary cure) with the mold closed, after which the resultant molded foam is taken out of the mold. The primary cure is performed at 60 to 120° C., for example, for 10 to 120 minutes. The molded foam taken out of the mold after the primary cure should preferably further undergo a secondary cure, which is performed at 90 to 180° C., for example, for 8 to 24 hours. In this embodiment, the elastic member in which the magnetic powder 22 is dispersed is polyurethane elastomer, so that the material takes only a short time to cure, and can be made to cure before the magnetic powder 22 in the material settles. Accordingly it is possible to disperse the magnetic powder 22 evenly. It is thus possible to disperse magnetic powder 22 having a particle size of even 100 µm or more in the magnetic elastic body 20 so that the magnetic flux density of the magnetic elastic body 20 can be made higher. In this embodiment, the magnetic powder 22 is mixed with the second liquid after it has been mixed into the first liquid, so that the magnetic powder 22 can be dispersed evenly in the elastomeric foam 21 as compared to when the magnetic powder 22 is mixed with the first liquid after it has been mixed into the second liquid.

Next, the molded foam described above is magnetized (S14). In this process, the magnetic moments of the particles 23 of the magnetic powder 22 in the molded foam are aligned by applying external magnetic fields. In this embodiment, external magnetic fields are applied in the axial direction of the columnar elastomeric foam 21. Magnetization may be performed to the molded foam in a non-deformed, natural length state, or, in a state axially compressed from a natural length state (e.g. compressed by 50%). The above process produces the magnetic elastic body 20 from the molded foam. It is particularly preferable if the magnetic flux density (surface magnetic flux density) of the magnetic elastic body 20 is increased by 5% or more from that of the natural length state when compressed in the main axial direction by 10%. Such a magnetic elastic body 20 can be produced, for example, by magnetizing the magnetic powder 22 dispersed in the elastomeric foam 21 in a compressed state (e.g., compressed by 50%) in the direction of compression.

The magnetic elastic body 20 of this embodiment can change the magnetic flux density by undergoing deformation (elastic deformation). The electromagnetic induction device 10 of this embodiment can thus generate an induced current I by changing the magnetic flux extending axially through the coil 11 by causing a deformation in the magnetic elastic body 20. This is mainly attributable to some change in magnetization in the magnetic elastic body 20 as described below.

In this embodiment, when the magnetic elastic body 20 is compressed, the air bubbles in the elastomeric foam 21 are collapsed. Therefore, the magnetic elastic body 20 hardly expands in the radial direction of the coil 11 even when it is compressed in the axial direction of the coil 11 (see the change from FIG. 2A to FIG. 2B). This inhibits a change in the orientation of the magnetic moments of the particles 23 of the magnetic powder 22 resulting from the deformation of the magnetic elastic body 20 in the radial direction of the coil 11. Namely, the direction of magnetization of the particles 23 of the magnetic powder 22 can readily be maintained in the axial direction of the coil 11 even though the magnetic elastic body 20 undergoes deformation in the axial direction of the coil 11.

It is known that there is the following relationship, along the axial direction of the coil 11, between the magnetic flux density Bz in the magnetic elastic body 20, and the external magnetic field Hz, magnetization Mz of the magnetic elastic body 20, and permeability in vacuum µ0: Bz=µ0·Hz+Mz . . . (A). It is also known that there is the following relationship between magnetization Mz, and the mean value mz of the magnetic moments of particles 23 of magnetic powder 22 in the axial direction of the coil 11 and the number n of particles 23 of magnetic powder 22 per unit volume of the magnetic elastic body 20:

$$Mz = n \cdot mz \quad (B)$$

Figure 4A:
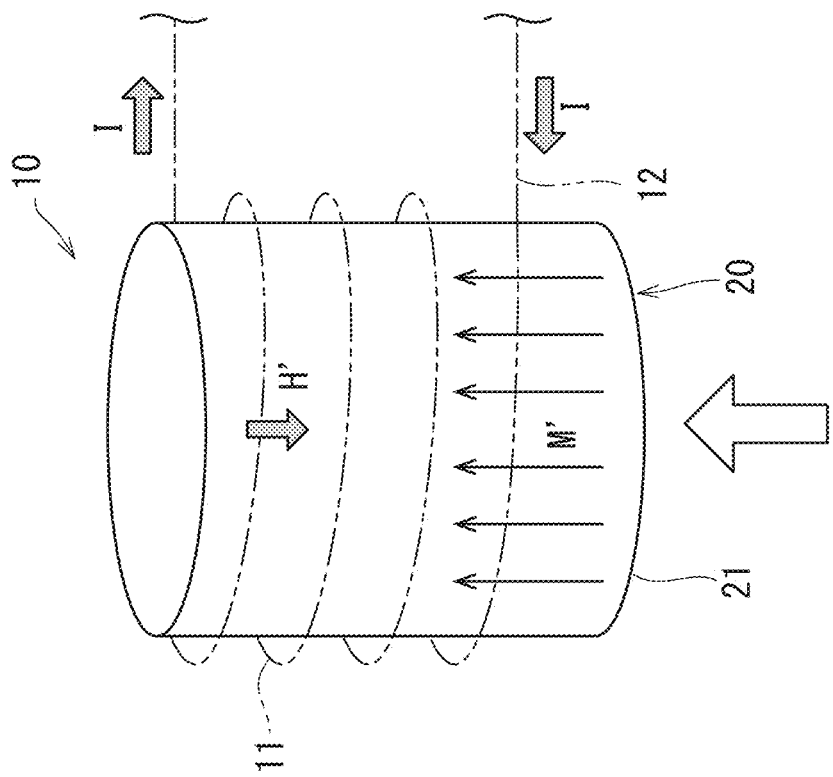
FIG. 4A is a conceptual diagram illustrating magnetization of the magnetic elastic body before being compressed and deformed.
Figure 4B:
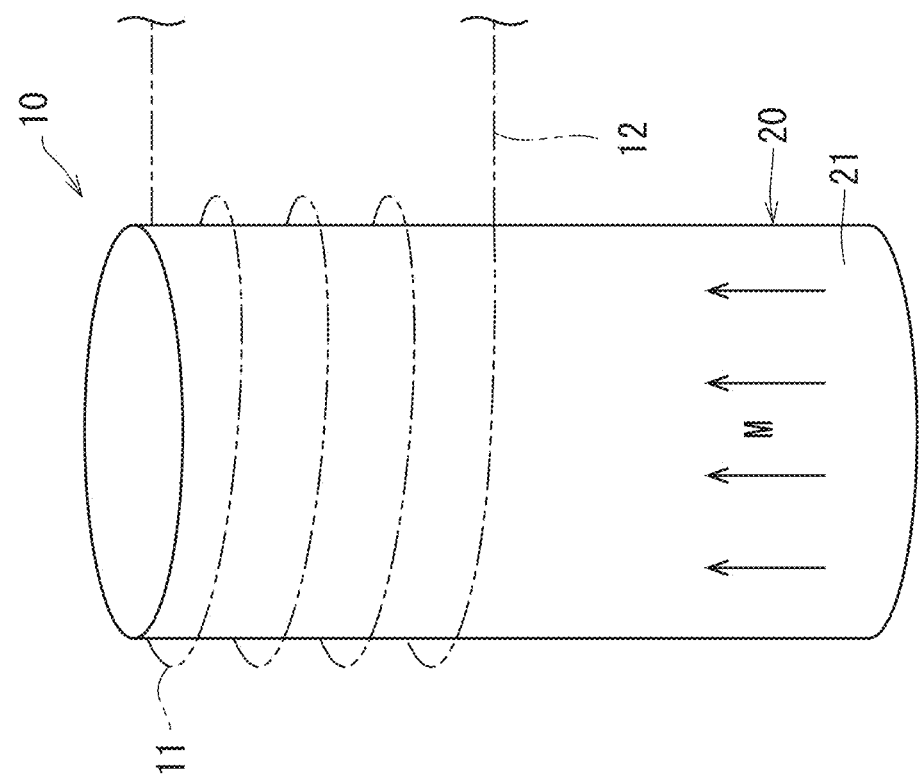
FIG. 4B is a conceptual diagram illustrating the magnetization of the magnetic elastic body and an induced current when the elastic body is being compressed and deformed.

It is considered that compression of the magnetic elastic body 20 in the axial direction of the coil 11 (FIG. 2B) increases the distribution density of the particles 23 of the magnetic powder 22 (i.e., the value n in the relational equation (B) becomes higher) in the magnetic elastic body 20, which in turn increases the magnetization Mz. In the case, in particular, where the magnetic elastic body 20 (magnetic powder 22) has been magnetized in a compressed state (relative to its natural length state) for example in the axial direction, it is assumed that the mean value mz of the magnetic moments is increased when the magnetic elastic body 20 is compressed in the axial direction of the coil 11, because the magnetic moments of the particles 23 of magnetic powder 22 are aligned more along the axial direction of the coil 11 than in the natural length state. It is thus assumed that the magnetization Mz is increased even more due to the increased mean value mz of the magnetic moments in addition to the effect of the raised distribution density of the magnetic powder 22 mentioned above. Specifically, the magnetization Mz is considered to become particularly large when the magnetic elastic body 20 is compressed and the amount of compression reaches around that when magnetized (i.e., amount of compression with which a state is achieved where the magnetic moments mz of the magnetic powder 22 are most aligned along the main axial direction). The magnetic flux density Bz in the magnetic elastic body 20 rises with the increased magnetization Mz as seen from the relational equation (A) above, so that the magnetic flux extending through the coil 11 is increased. It is assumed that this results in an induced current I flowing in the coil 11 such as to generate a magnetic field H' in the direction (downward in FIG. 4) in which this change in the magnetic flux is cancelled. In FIG. 4 and FIG. 5, the induced current I and magnetic fields H' generated by the induced current I are indicated with grey arrows.

In this embodiment, the magnetic elastic body 20 is made of a foam. It is thus easy to increase the distribution density of the particles 23 of the magnetic powder 22 in the magnetic elastic body 20 when the magnetic elastic body 20 is compressed, so that the change in magnetic flux density of the magnetic elastic body 20 can be made larger. This allows the induced current I to be generated easily.

Stretching the magnetic elastic body 20 in the axial direction of the coil, as opposed to the example described above where the magnetic elastic body 20 is compressed, is assumed to cause the magnetization Mz to decrease, and the induced current I will flow in the opposite direction from the case where the magnetic elastic body 20 is compressed.

Figure 5A:
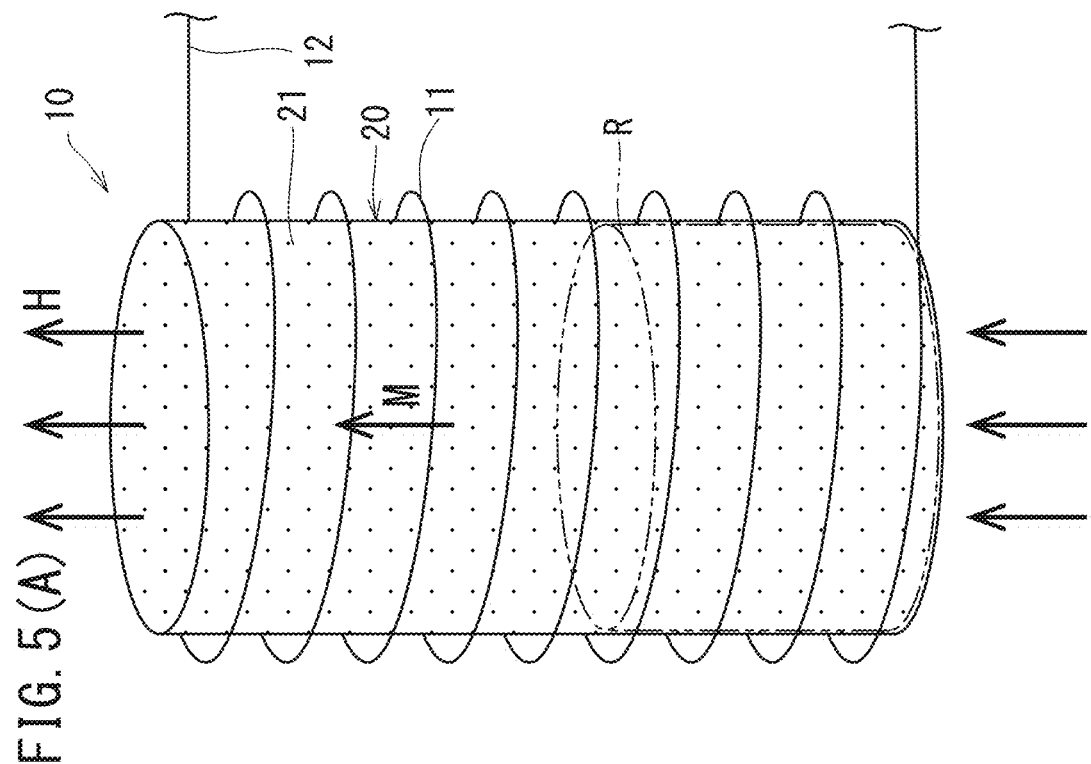
FIG. 5A is a conceptual diagram illustrating magnetic fields created by the magnetic elastic body before being compressed and deformed and magnetization of the magnetic elastic body.
Figure 5B:
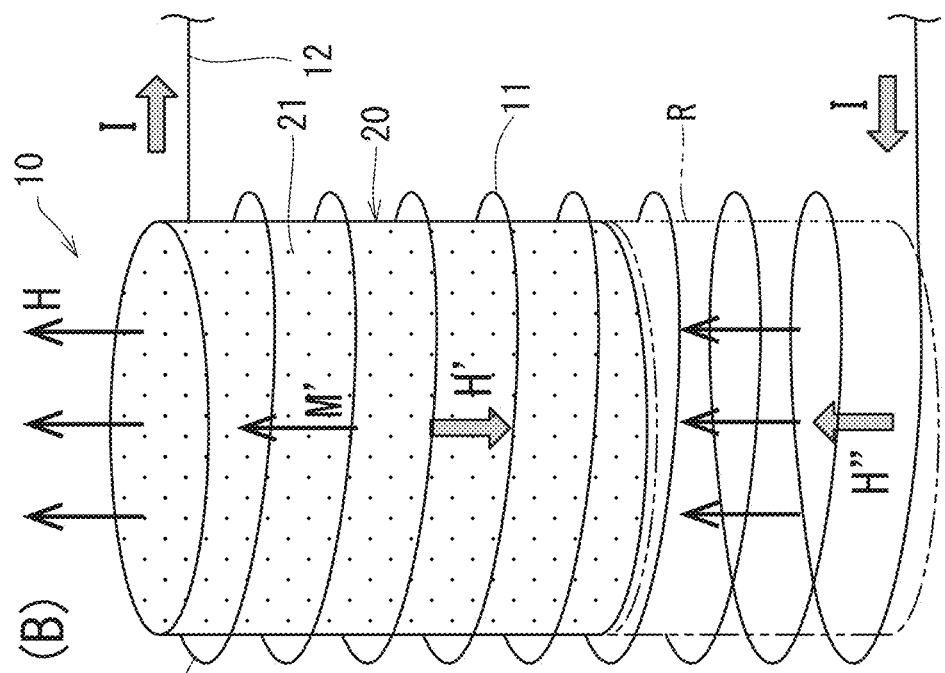
FIG. 5B is a conceptual diagram illustrating induced magnetic fields and an induced current generated in the coil and circuit when the magnetic elastic body is compressed.

FIG. 5A and FIG. 5B illustrate an example in which deformation of the magnetic elastic body 20 causes the size of a part of the magnetic elastic body 20 disposed inside the coil 11 to change. In this case, as will be described below, there will be a change in magnetic flux extending through the coil 11 due to other factors than the change in magnetization of the magnetic elastic body 20.

In the example of FIG. 5A and FIG. 5B, the magnetic elastic body 20 is compressed in the axial direction of the coil 11. In this case, there will be a region R inside the coil 11 where the magnetic elastic body 20 exists before the deformation thereof (FIG. 5A) while the magnetic elastic body 20 does not exist after the deformation (FIG. 5B). The magnetic flux in this region R undergoes a change after the deformation of the magnetic elastic body 20, and accordingly it is considered that a magnetic field H" is generated in the region R such as to cancel this change in magnetic flux. This magnetic field H" can be oriented oppositely from the magnetic field H' that is generated by a change in distribution density of the particles 23 of the magnetic powder 22 in the magnetic elastic body 20 as described above. It is assumed, however, that, since these magnetic fields do not always have the same size in the course of deformation of the magnetic elastic body 20, there occurs a change in magnetic flux extending through the coil 11, so that an induced current I can be generated in the coil 11. In such cases where magnetic fields H' and H" oriented oppositely from each other are generated, another coil 11V of another circuit 12V different from the circuit 12 may optionally be disposed around the region R, as illustrated in FIG. 6. By using different circuits to cause induced currents to be generated by the magnetic fields H' and H" this way, it is possible to prevent these induced currents from cancelling each other. The same applies to when the magnetic elastic body 20 is stretched, as when the magnetic elastic body 20 is compressed.

In the electromagnetic induction device 10 of this embodiment, the magnetic elastic body 20 disposed inside the coil 11 is made of an elastomeric foam 21 containing a magnetic powder 22 dispersed therein. As the magnetic elastic body 20 undergoes elastic deformation in the axial direction of the coil 11, an induced current I is generated in the coil 11 (circuit 12). According to this embodiment, as described above, the magnetized body (magnetic elastic body 20) for generating an induced current in the circuit 12 has elasticity, so that the magnetic elastic body 20 is hardly breakable when a force is applied to the magnetic elastic body 20 such as vibration. The elasticity also allows the magnetic elastic body 20 to undergo vibratory deformation when generating the induced current I. Moreover, since the magnetic elastic body 20 is compressed to generate an induced current I in the coil 11, the electromagnetic induction device 10 can be made more compact in the axial direction of the coil 11 as compared to when a rigid body is used instead of the magnetic elastic body 20. Furthermore, according to this embodiment, the magnetic elastic body 20 is made of a foam, and the magnetic elastic body 20 hardly expands in the radial direction of the coil 11 when compressed in the axial direction of the coil 11, so that the electromagnetic induction device 10 can be made more compact also in the radial direction of the coil 11.

Confirmatory Test

It was confirmed that an induced current I was generated in the coil 11 by elastic deformation of the magnetic elastic body 20 disposed inside the coil 11 in the electromagnetic induction device 10. Specifically, generation of an electromotive force in the coil 11, as a substitute value of induced current I, was confirmed.

Configuration of Electromagnetic Induction Device

For the coil 11, a copper coil having a winding diameter (inner diameter) of 36 mm (36Φ), an axial length of 70 mm, a wire diameter of 0.5 mm, a number of windings of 1395, and a resistance of 13Ω was used. For the magnetic elastic body 20, one made of a polyurethane elastomeric foam 21 containing a neodymium magnetic powder dispersed therein was used. Neodymium magnetic powders having different particle sizes (5 μm and 100 μm) were used. The magnetic elastic body 20 is columnar, with a diameter of 23 mm and an axial length of 23 mm. The magnetic elastic body 20 was magnetized with 8 tesla for 3 seconds. The magnetic elastic body 20 was magnetized both in a natural length state and in a state in which the elastic body was compressed by 50% in the axial direction. In this test, the magnetic elastic body 20 was disposed coaxially with the coil 11, and such that the center position in the natural length state of the magnetic elastic body 20 coincided with that of the coil 11. The magnetic elastic body 20 was entirely accommodated inside the coil 11, with its axis oriented in the up and down direction. The magnetic elastic body 20 was elastically deformed by being compressed from one axial end (from below).

Particulars of the magnetic elastic bodies of test examples

The particulars of the materials for the magnetic elastic bodies 20 are as follows:

First Liquid

Polyol; Polyester polyol (Molecular weight: 2000, Number of functional groups: 2, Hydroxyl value: 56 mgKOH/g, Product Name: "Polylite OD-X-102", produced by DIC corporation Isocyanate; 1.5-Naphthalene-1.5-diisocyanate (NCO %: 40%, Product Name: "Cosmonate ND", produced by Mitsui Chemicals Inc.

Neodymium magnetic powder; (1) MQFP (5 μm), produced by Magnequench International, LLC, (2) MQFP (100 μm), produced by Magnequench International, LLC Second Liquid Catalyst; Amine catalyst, Product Name: "Addocat PP", produced by Rhein Chemie Japan Foaming agent; Liquid mixture containing castor oil and water, Product Number: "Addovate SV" (castor oil/water weight ratio 50:50), produced by Rhein Chemie Japan This test used magnetic elastic bodies 20 of various expansion ratios of elastomeric foam 21, and various composition ratios, particle sizes, and magnetization methods of the neodymium magnetic powder (Test Examples 1 to 5). The magnetization conditions, and various characteristics of the magnetic elastic bodies 20 of respective test examples are as indicated in FIG. 8.

FIG. 8 indicates the particulars and characteristics of the elastomeric foams of Test Examples 1 to 5. Test Example 1 is an elastomeric foam 21 with an expansion ratio of 2 folds magnetized in a natural length state. The neodymium magnetic powder has a particle size of 5 μm, a mass percentage of 50 mass %, and a volume percentage of 3.3 vol %. Test Example 2 is an elastomeric foam 21 with an expansion ratio of 4 folds and the neodymium magnetic powder has a volume percentage of 1.6 vol %. Other conditions are the same as those of Test Example 1. Test Example 3 contains a neodymium magnetic powder having a mass percentage of 60 mass % and a volume percentage of 3.9 vol %. Other conditions are the same as those of Test Example 1. Test Example 4 was magnetized in a compressed state in which it was axially compressed by 50%. Other conditions are the same as those of Test Example 3. Test Example 5 contains a neodymium magnetic powder having a particle size of 100 μm. Other conditions are the same as those of Test Example 3.

Test Method

Density and Expansion Ratio of Elastomeric Foam

Columnar test samples of magnetic elastic bodies 20 with a diameter of 23 mm and an axial length (thickness) of 23 mm were prepared from the first liquid and second liquid that did not contain neodymium magnetic powder, and the density was measured in accordance with JIS K6268:1998. The expansion ratio of the elastomeric foam 21 was calculated from this density.

Mass Percentage and Volume Percentage of Neodymium Magnetic Powder

The mass percentage of the neodymium magnetic powder was determined by measuring the mass of the neodymium magnetic powder relative to the mass of the first liquid using a weighing scale. The volume percentage of the neodymium magnetic powder was calculated by the following formula from the mass percentage of the neodymium magnetic powder, density of the neodymium magnetic powder, and density of the elastomeric foam 21. The density of the neodymium magnetic powder was 7.6 g/cm$^3$.

Volume percentage of neodymium magnetic powder (%)=(Mass percentage of neodymium magnetic powder×Density of elastomeric foam)/(Density of neodymium magnetic powder).

Compression Set

Test samples of magnetic elastic bodies 20 with a diameter of 13 mm and a thickness of 6.3 mm were prepared, and the compression set was measured in accordance with Method A of JIS K 6262:2013 (Small test piece, 70° C.×22 hours, compressed by 25%).

Repeated Compression Set

Test samples of magnetic elastic bodies 20 with a diameter of 23 mm and an axial length (thickness) of 23 mm were compressed by 50% relative to the natural length state (original thickness) in the axial direction 100,000 times at 1 Hz (once per second), and the rate of change in thickness after this repeated compression test was measured. The repeated compression set was then calculated from the following formula. The measurement was made at normal temperature (23° C.).

Repeated compression set (%)=(Thickness before compression test−Thickness after compression test)/(Thickness before compression test)×100.

Surface Magnetic Flux Density

Test samples of magnetic elastic bodies 20 with a diameter of 23 mm and an axial length of 23 mm were prepared. The surface magnetic flux density was determined by measuring the magnetic flux density at the center of both axial end faces, upper face and lower face, 10 times each (20 times in total) using a gauss meter ("MG-601" produced by Magna Co., Ltd.), and by calculating the mean value. The surface magnetic flux density of the magnetic elastic bodies 20 was measured in the natural length state, and in compressed states in which the elastic body was compressed by 10%, 25%, and 50% from the natural length state in the axial direction, and the rate of change in surface magnetic flux density of each compressed state relative to the natural length state was calculated.

Generated Power

Figure 7:
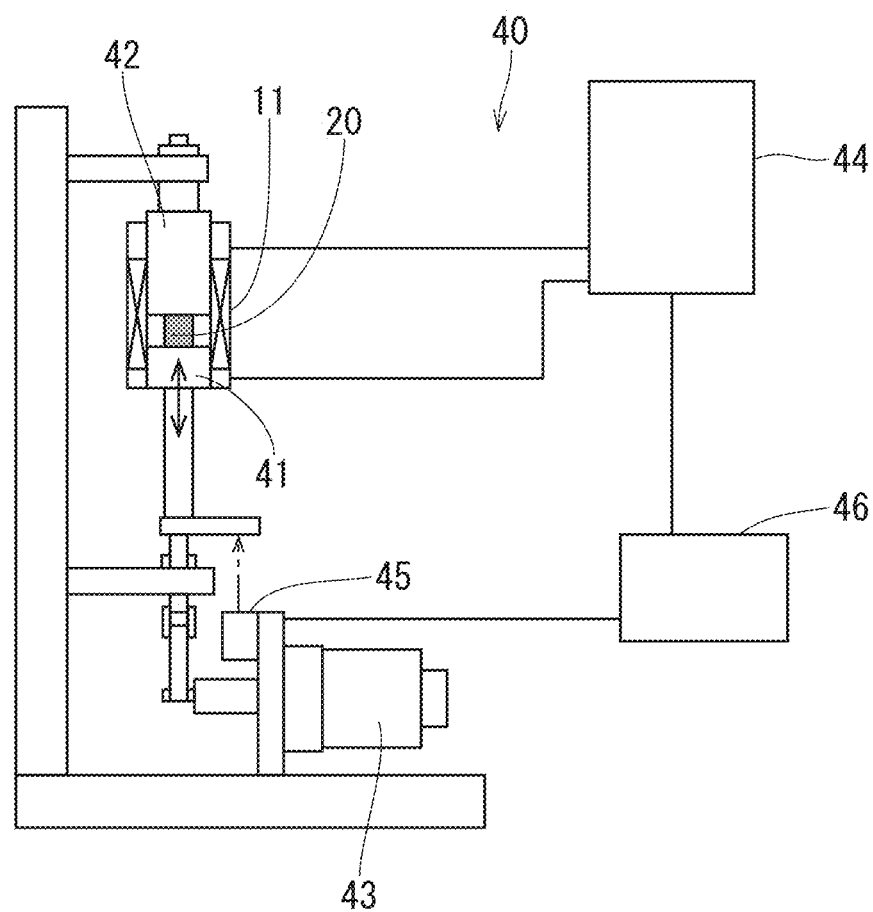
FIG. 7 is a conceptual diagram of a test machine.

The magnetic elastic body 20 was vibrated to undergo deformation such as to be repeatedly compressed and restored in the axial direction of the coil 11 by a test machine 40 illustrated in FIG. 7, and power generation was evaluated by measuring the voltage between both ends of the coil 11. The voltage was measured under each of 9 conditions of combinations of 3 levels of compression rate (stroke) and 3 levels of frequency for the vibratory deformation of the magnetic elastic body 20. Specifically, the levels of amplitude were 6 mm, 8 mm, and 10 mm (displacement), and the levels of frequency were 1 Hz, 5 Hz, and 10 Hz.

The details of the test machine 40 are as follows. The test machine 40 has a piston 41 and a fixing member 42 that hold both ends of the magnetic elastic body 20 in the axial direction of the coil 11 inside the coil 11. The piston 41 vibrates in the axial direction of the coil 11 by the power from a drive source 43 to deform the magnetic elastic body 20 in a vibratory manner. The distance between the fixing member 42 and the piston 41 is set such that it is equal to the natural length of the magnetic elastic body 20 when the piston 41 is farthest from the fixing member 42 in its vibration stroke. Namely, in this test, the fixing member 42 and the piston 41 are always in contact with the magnetic elastic body 20.

Both ends of the coil 11 are connected to an oscilloscope 44, which indicates the electromotive force induced in the coil 11. The test machine 40 further includes a laser displacement sensor 45 for detecting the vibration of the piston 41. The laser displacement sensor 45 outputs signals relating to the amplitude and frequency of the piston 41 to the oscilloscope 44 via an amplifier unit 46 so that the amplitude and frequency of the vibration of the piston 41 can be checked with the oscilloscope 44.

Test Results

Since all the test examples 1 to 5 use polyurethane elastomer for the elastomeric foam 21, they showed favorable results of the compression set of 21 to 25% and repeated compression set of 13 to 18%.

The surface magnetic flux densities in the natural length state of Test Examples 1 to 3 were 9.2 mT, 4.6 mT, and 10.3 mT, respectively, i.e., the larger the volume percentage of neodymium magnetic powder, the higher the surface magnetic flux density. The surface magnetic flux densities in the natural length state of Test Examples 3 and 5 were 10.3 mT and 14.6 mT, respectively, which indicates that the larger the particle size of neodymium magnetic powder, the higher the surface magnetic flux density. The surface magnetic flux densities in the natural length state of Test Examples 3 and 4 were 10.3 mT and 9.2 mT, respectively, i.e., Test Example 3 had a higher surface magnetic flux density. On the other hand, the surface magnetic flux densities in the 10%, 25%, and 50% compressed states were 10.5 mT and 9.9 mT, 10.7 mT and 10.6 mT, and 10.9 mT and 12.6 mT, respectively, and the rates of change were 1.9% and 7.6%, 3.9% and 15.2%, and 5.8% and 37.0%, respectively. That is, in the 50% compressed state, Test Example 4 had a higher surface magnetic flux density. This is attributable to the increase in distribution density of neodymium magnetic powder, as well as the alignment of the magnetic moments of neodymium magnetic powder when compressed as compared to the natural length state. Namely, the number n of neodymium magnetic powder particles per unit volume and the mean value mz of the magnetic moments in the relational equation (B) given above were both increased so that the magnetization Mz was increased, resulting in the larger rate of change in comparison to that of the natural length state. The increased magnetization Mz resulted in the higher magnetic flux density Bz (see the relational equation (A)). The rate of change in surface magnetic flux density from the natural length state when compressed by 50% in Test Example 3 was 5.8%, whereas the rate of change from the natural length state when compressed by 10% in Test Example 4 was 7.6%. This indicates that the change in surface magnetic flux density (magnetic flux density) can be made larger even though the degree of elastic deformation is low.

A comparison between Test Example 1 and Test Example 3 shows that more power was generated when the mass percentage (volume percentage) of neodymium magnetic powder was higher. It is also shown that more power was generated when the compression rate (displacement) was larger and when the frequency was higher.

Figure 9A:
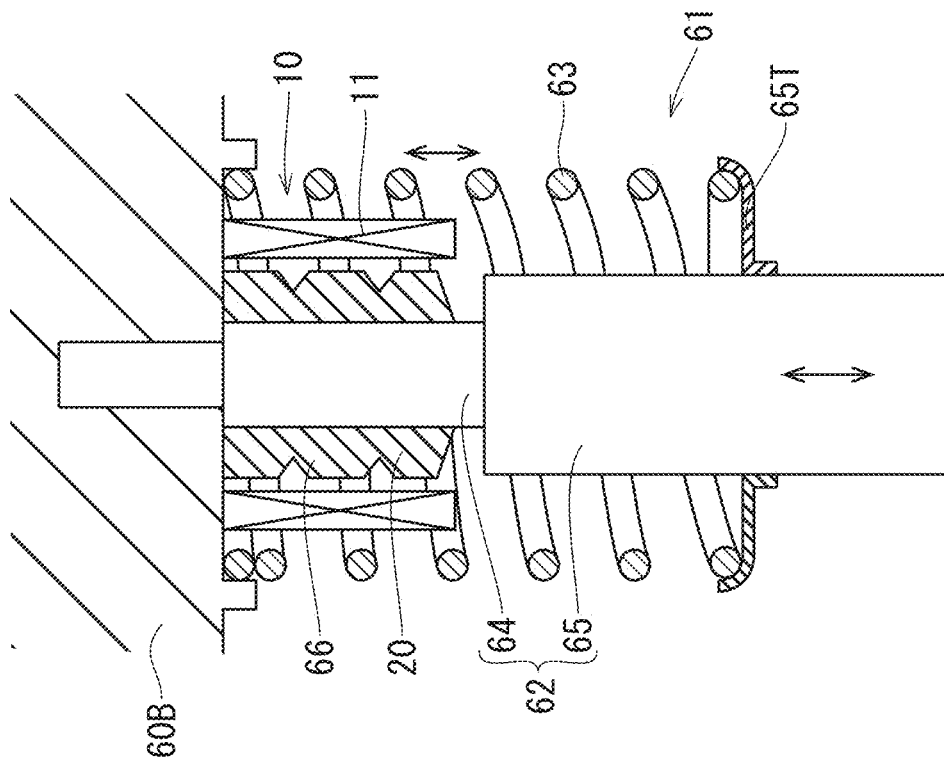
FIG. 9A is a block diagram of a power generation system and FIG. 9B is a partially broken side view of a suspension of a vehicle.
Figure 9B:
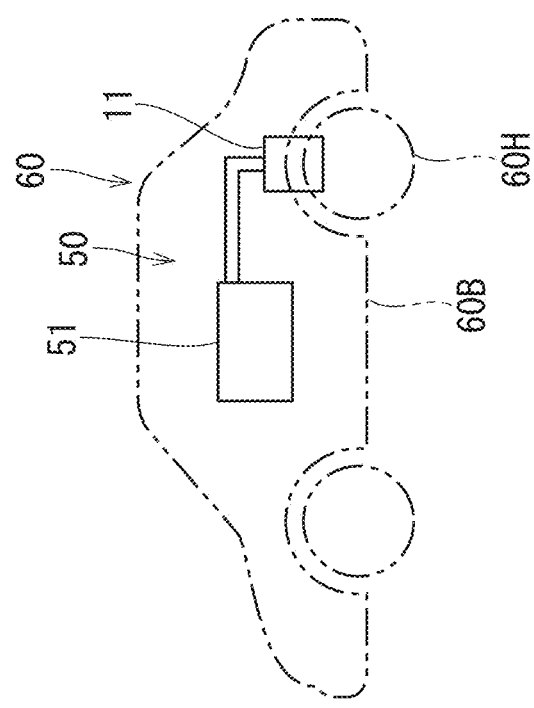

Examples of Apparatuses Having Magnetic Elastic Body and Electromagnetic Induction Device FIG. 9A and FIG. 9B illustrate an example of a power generation system 50 that has the electromagnetic induction device 10. The power generation system 50 converts vibrational energy into electrical energy to charge a battery 51. In the power generation system 50, the electromagnetic induction device 10 is assembled to a suspension 61 of a vehicle 60.

As illustrated in FIG. 9B, the suspension 61 includes a shock absorber 62 and a suspension spring 63. The shock absorber 62 is configured to extend and contract by causing the piston rod 64 to reciprocate straight inside the cylinder 65. For example, the piston rod 64 is secured to a vehicle body 60B (see FIG. 9A), while the cylinder 65 is secured to the rotation axis of a wheel 60H. The suspension spring 63 is disposed to surround the shock absorber 62 and sandwiched between a flange 65T outwardly extending from the cylinder 65 and the vehicle body 60B. The shock absorber 62 extends and contracts with the extension and contraction of the suspension spring 63.

The vehicle 60 is provided with a bump stop 66 that is tubular or annular and fitted to the piston rod 64. When the shock absorber 62 contracts, the bump stop 66 is pressed by the cylinder 65 and compressed between the cylinder 65 and the vehicle body 60B. In the example of this embodiment, the bump stop 66 is cylindrical and includes annular grooves at several positions along the axial direction on the outer circumferential surface. Alternatively, the piston rod 64 may be provided with a flange on the side facing the vehicle body 60B so that the bump stop 66 is compressed between this flange and the cylinder 65. The cylinder 65 and the vehicle body 60B or the flange mentioned above in this example correspond to "a pair of opposing members" in the claims. The shock absorber 62 corresponds to "an extension and contraction mechanism" in the claims.

In the power generation system 50 of this example, a winding (in the example of this embodiment, the coil 11) provided in the circuit 12 is disposed coaxially with the bump stop 66 such as to surround the bump stop 66 inside the suspension spring 63 (see FIG. 9B). Namely, the shock absorber 62 extends and contracts in the axial direction of the coil 11. The coil 11 is connected to the battery 51 (see FIG. 9A). In the power generation system 50 of this example, the bump stop 66 is made of the magnetic elastic body 20. Specifically, the bump stop 66 is magnetized in the axial direction. Accordingly, the bump stop 66, or the magnetic elastic body 20, can undergo elastic deformation in the axial direction of the coil 11 as the cylinder 65 of the vehicle 60 and the vehicle body 60B vibrate due to road irregularities or the like, and can generate an induced current I in the coil 11 (circuit 12). The power generation system 50 of this example is able to charge the battery 51 with the induced current I generated in the coil 11 by the vibration of the vehicle 60 and thus enables effective use of vibratory energy of the vehicle. The magnetic elastic body 20 having elasticity allows the use of the bump stop, which is initially provided to the vehicle 60, for power generation. The winding that surrounds the bump stop 66 in the circuit 12 may be configured to have several windings similarly to the coil 11, or just one winding.

Figure 10A:
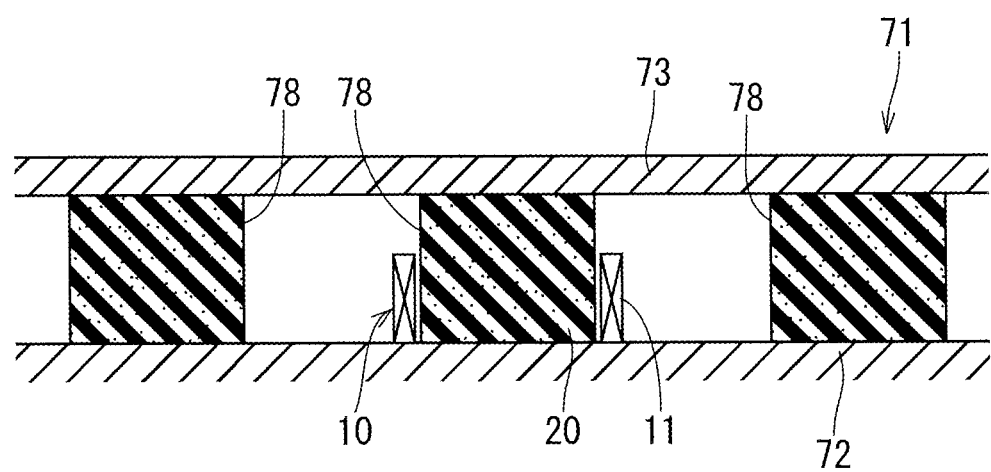
FIG. 10A is a cross-sectional side view of a floor structure and an electromagnetic induction device.
Figure 10B:
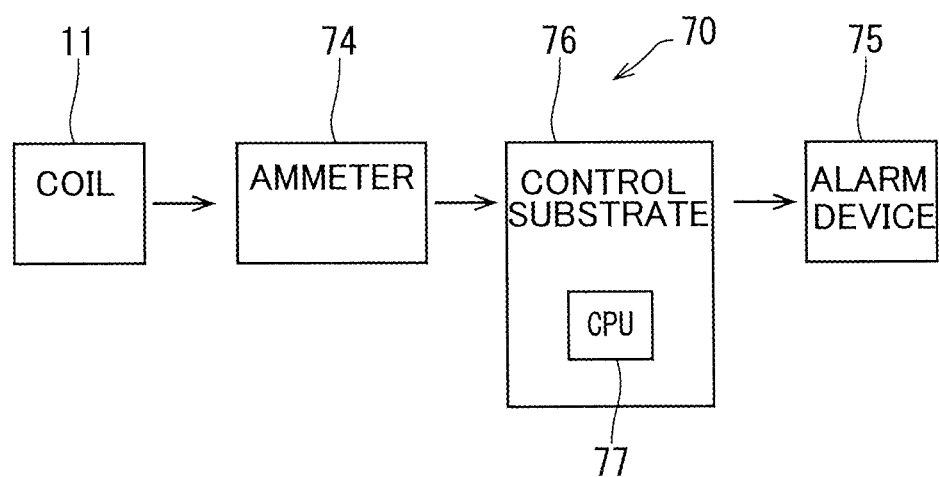
FIG. 10B is a block diagram of a detection device.

FIG. 10A and FIG. 10B illustrate an example of a detection device 70 that has the electromagnetic induction device 10. As illustrated in FIG. 10A, the detection device 70 is used in a floor structure 71 of a building or a vehicle. Specifically, this floor structure 71 has a base 72 and a floor panel 73 laid over the base, with a plurality of cushioning members 78 packed between the base 72 and the floor panel 73. A load applied to the floor panel 73 causes the cushioning members 78 to deform elastically.

In the detection device 70 of this example, some of the plurality of cushioning members 78 include the coil 11 of the circuit 12 wound therearound. The cushioning members 78 wound around with the coil 11 are made of the magnetic elastic body 20. Accordingly, when a load is applied to the floor panel 73 and the magnetic elastic body 20 deforms, an induced current I is generated in the coil (circuit 12).

As illustrated in FIG. 10B, the detection device 70 of this example includes an ammeter 74, an alarm device 75, and a control substrate 76. The ammeter 74 detects the induced current I generated in the coil. The alarm device 75 generates an alarm by a sound, indication, or vibration, etc., and may be, for example, a speaker, or a display device. The control substrate 76 is electrically connected to the ammeter 74 and alarm device 75, and outputs a control signal to the alarm device 75 based on the detection results of the ammeter 74. More particularly, a CPU 77 provided on the control substrate 76 determines whether or not the induced current I generated in the coil 11 is within a predetermined reference range, and outputs a control signal to the alarm device 75 to generate an alarm if the current falls out of the reference range. The reference range may be, for example, a predetermined value which the amount of the induced current I should not exceed, or, in the case where the induced current I is an alternating current, a predetermined value which the amplitude or frequency of this induced current I should not exceed. Instead of the ammeter 74, a voltage meter may be provided for measuring the voltage at both ends of the coil (i.e., for detecting an induced electromotive force generated in the coil 11), in which case it may be determined whether or not the detected induced electromotive force falls within a reference range.

As described above, when a load is applied to the floor panel 73 causing the magnetic elastic body 20 to deform and an induced current I flows in the coil 11, the detection device 70 of this example determines whether or not this induced current I is within a predetermined reference range. If the induced current falls out of the reference range, the alarm device 75 generates an alarm. Thus abnormality such as an excessive load or abnormal vibration occurring in the floor panel 73 is easily detected. The magnetic elastic body 20 having elasticity allows the cushioning members provided to the floor structure 71 to be used for detection of an abnormality.

Figure 11:
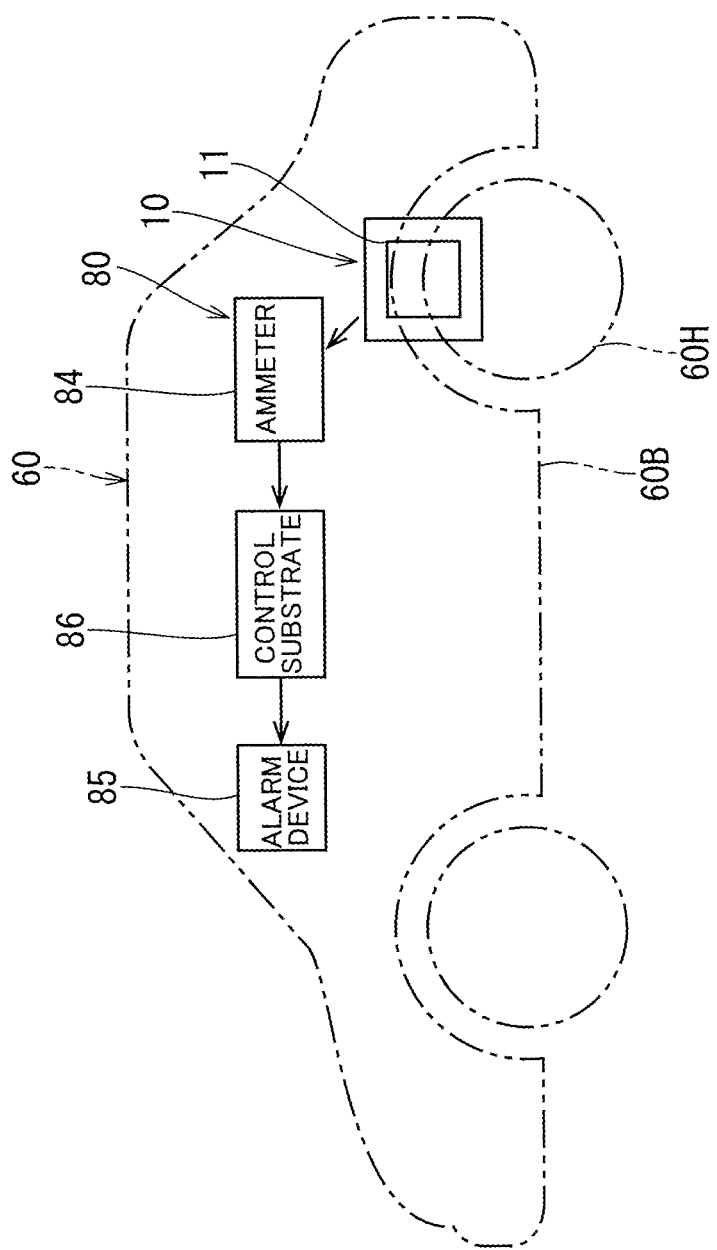
FIG. 11 is a block diagram of a detection device according to another embodiment.

Other Embodiments (1) The electromagnetic induction device 10 may be provided to a detection device 80 illustrated in FIG. 11. The electromagnetic induction device 10 in the detection device 80 is assembled to a suspension 61 of the vehicle 60, similarly to the example illustrated in FIG. 9B. The detection device 80 includes an ammeter 84, an alarm device 85, and a control substrate 86 similar to the ammeter 74, alarm device 75, and control substrate 76 of the detection device 70 described in the foregoing. The alarm device 85 is provided to a navigation system of the vehicle 60, for example. This detection device 80 can notify the passenger of an abnormal load being applied to the vehicle 60, or abnormal vibration occurring due to a failure in the suspension 61, via the navigation system. The alarm device 85 may be disposed in a location away from the vehicle 60 (e.g., monitoring center). In this case, a wireless connection may be used as suited for the connection between the electromagnetic induction device 10 and the alarm device 85, for example. Such a configuration enables detection of an abnormal load on the vehicle 60 or abnormal vibration in the vehicle from a location away from the vehicle 60.

(2) As long as the magnetic elastic body 20 is disposed inside the coil 11 in the radical direction of the coil 11 in the electromagnetic induction device 10, the magnetic elastic body may be disposed outside the coil 11 in the axial direction of the coil 11. For example, the magnetic elastic body 20 may be disposed such that it is partly accommodated in the coil 11 in its natural length state, while entirely getting out of the coil 11 when compressed.

(3) While the magnetic elastic body 20 is magnetized in the axial direction of the coil 11 in the embodiment described above, the direction of magnetization may be inclined relative to the axial direction of the coil 11.

(4) While the magnetic elastic body 20 in the embodiment described above is columnar, the shape is not limited to this and may be rectangular or spherical. The magnetic elastic body may also be in a product shape of the bump stop 66 described above (see FIG. 9B).

(5) While the coil 11 and the magnetic elastic body 20 are disposed coaxially in the embodiment described above, they may be disposed such that the center axes of the coil 11 and the magnetic elastic body 20 are parallel, or inclined to each other.

(6) As opposed to the embodiment described above in which the coil 11 is provided to the circuit 12 for generating an induced current, the coil 11 may not necessarily be provided. In this case, the circuit 12 may be disposed such that a current is induced by an elastic deformation of the magnetic elastic body 20.

(7) The elastic deformation of the magnetic elastic body 20 for generating an induced current in the coil 11 (circuit 12), which is compression in the embodiment described above, may be extension, torsion, or flexion.

(8) The magnetic elastic body 20 is made of an elastomeric foam containing a magnetic powder dispersed therein, so that it can readily be cut into any desired shape. Any pieces cut from the magnetic elastic body are magnets themselves having a north pole and a south pole, which may allow application of the magnetic elastic body 20 as toys. Since the magnetic elastic body 20 is lighter than ferrite magnets and the like, it can be used in floating applications in which they are kept floating by a magnetic force of other magnets or the like.

(9) Instead of 1.5-Naphthalene-1.5-diisocyanate (NDI) used as the isocyanate material of the magnetic elastic body 20 in the embodiment described above, methylene diphenyl diisocyanate (MDI) may also be used.

(10) The detection device 80 in the embodiment described above is configured to detect a change based on an induced electromotive force (induced current) in the coil 11 (circuit 12). Instead, the device may be configured to detect a change in the magnetic flux density of the magnetic elastic body 20 with a magnetic sensor. Examples of magnetic sensors include Hall sensors, TMR (tunnel magnetoresistance effect) sensors, GMR (giant magnetoresistance effect) sensors, AMR (anisotropic magnetoresistance effect) sensors, and so on.

What is claimed is:

1. An elastic body comprising an elastic member containing a magnetized magnetic powder dispersed therein, the elastic body generating an induced current in a circuit by undergoing elastic deformation to cause a change in magnetic flux density, the elastic member being an elastomeric foam; wherein the elastomeric foam has an expansion ratio of 1.4 to 6 folds and at least includes a part with a continuous air bubble structure.

2. The elastic body according to claim 1, wherein the elastic deformation involves a change in distribution density of the magnetic powder in the elastic body, which causes a change in magnetic flux density.

3. The elastic body according to claim 1, wherein the elastomeric foam is a polyurethane elastomer, and the magnetic powder has a particle size of 3 to 200 µm.

4. The elastic body according to claim 1, wherein
the magnetic powder is made of a hard ferromagnetic material,
the elastic body having a mass percentage of the magnetic powder of 40 to 80% relative to the elastomeric foam, and
a volume percentage of the magnetic powder of 1.0 to 3.5% relative to the elastomeric foam.

5. The elastic body according to claim 1, wherein the elastic body has a compression set of not more than 30% as measured by Method A of JIS K 6262:2013.

6. The elastic body according to claim 1, wherein the elastic body has a repeated compression set of not more than 20% when repeatedly compressed by 50% 100,000 times at 1 Hz.

7. A bump stop made of the elastic body according to claim 1 and wound around with an electromagnetic induction coil.

8. An electromagnetic induction device comprising
the elastic body according to claim 1, and
an electromagnetic induction circuit in which a change in magnetic flux density occurring with an elastic deformation of the elastic body causes an induced current to flow.

9. A power generation system comprising
the electromagnetic induction device according to claim 8, and
an extension and contraction mechanism for repeatedly extending and contracting the elastic body.

10. The power generation system according to claim 9, wherein the elastic body is formed in an annular or a tubular shape and fitted to a piston rod of a shock absorber of a vehicle, the extension and contraction mechanism including a pair of opposing members provided either to the piston rod and a cylinder of the shock absorber, or to one of the piston rod and the cylinder and a support part that supports the shock absorber, for compressing the elastic body.

11. A detection device comprising the electromagnetic induction device according to claim 8, and a detection circuit that detects a physical change involving a movement in a movable member that compresses, or stretches, or twists the elastic body, based on an induced electromotive force in the electromagnetic induction device.

12. A production method for an elastic body for producing the elastic body according to claim 1, comprising dispersing the magnetic powder in the elastic member, and magnetizing the magnetic powder, in a state in which the elastic member is compressed, in a direction of compression.

13. An elastic body comprising
an elastic member containing a magnetized magnetic powder dispersed therein, the elastic body generating an induced current in a circuit by undergoing elastic deformation to cause a change in magnetic flux density, the elastic member being an elastomeric foam; and
a pair of magnetic flux passing parts where a magnetic flux passes through on an outer surface thereof oriented oppositely from each other, wherein compressing the elastic body in a main axial direction along which the pair of magnetic flux passing parts are aligned increases the magnetic flux density.

14. The elastic body according to claim 13, wherein the elastomeric foam has an expansion ratio of 1.4 to 6 folds and at least includes a part with a continuous air bubble structure.

15. An elastic body comprising
an elastic member containing a magnetized magnetic powder dispersed therein, the elastic body generating an induced current in a circuit by undergoing elastic deformation to cause a change in magnetic flux density, the elastic member being an elastomeric foam; and
a pair of magnetic flux passing parts where a magnetic flux passes through on an outer surface thereof oriented oppositely from each other, wherein compressing the elastic body in a main axial direction along which the pair of magnetic flux passing parts are aligned increases the magnetic flux density; wherein, when the elastic body is compressed by 10% in the main axial direction from the natural length state, the magnetic flux density increases by 5% or more from that of the natural length state.

16. An elastic body comprising
an elastic member containing a magnetized magnetic powder dispersed therein, the elastic body generating an induced current in a circuit by undergoing elastic deformation to cause a change in magnetic flux density, the elastic member being an elastomeric foam; and
a pair of magnetic flux passing parts where a magnetic flux passes through on an outer surface thereof oriented oppositely from each other, wherein compressing the elastic body in a main axial direction along which the pair of magnetic flux passing parts are aligned increases the magnetic flux density; wherein, when compressed in the main axial direction, magnetic moments of the magnetic powder are aligned more in the main axial direction than in a natural length state without any deformation.

* * * * *